(12) United States Patent
Won

(10) Patent No.: US 9,420,093 B2
(45) Date of Patent: Aug. 16, 2016

(54) APPARATUS AND METHOD FOR PROVIDING ADDITIONAL INFORMATION BY USING CALLER PHONE NUMBER

(71) Applicant: Samsung Electronics Co., Ltd., Gyeonggi-do (KR)

(72) Inventor: Jong-Se Won, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/154,814

(22) Filed: Jan. 14, 2014

(65) Prior Publication Data

US 2014/0302829 A1    Oct. 9, 2014

(51) Int. Cl.
*H04M 3/42*       (2006.01)
*H04M 3/436*      (2006.01)
*H04M 1/57*       (2006.01)
*H04W 4/16*       (2009.01)

(52) U.S. Cl.
CPC .............. *H04M 3/436* (2013.01); *H04M 1/575* (2013.01); *H04W 4/16* (2013.01); *H04M 2250/60* (2013.01)

(58) Field of Classification Search
None
See application file for complete search history.

(56) References Cited

U.S. PATENT DOCUMENTS 8,428,568 B1 *   4/2013  Kim ............................. 455/415
8,649,489 B2 *   2/2014  Mornhineway et al. . 379/142.06

2001/0027098 A1 * 10/2001 Suzuki ......................... 455/415
2003/0100295 A1   5/2003  Sakai et al.
2007/0032231 A1   2/2007  Yoshii
2007/0054704 A1   3/2007  Satoh
2009/0176484 A1 *  7/2009 Lee .............................. 455/415
2010/0061532 A1   3/2010  Takiguchi

FOREIGN PATENT DOCUMENTS

| JP | 2003-143288 | 5/2003 |
|----|-------------|--------|
| JP | 2006-033040 | 2/2006 |
| JP | 2008-022241 | 1/2008 |
| JP | 2009-065496 | 3/2009 |
| KR | 1020060056681 | 5/2006 |
| KR | 100631772 | 9/2006 |
| KR | 1020070050279 | 5/2007 |
| KR | 20070075145 | 7/2007 |
| KR | 20100136709 | 12/2010 |

OTHER PUBLICATIONS

European Search Report dated Feb. 18, 2015 issued in counterpart application No. 14158157.9-1855.
Japanese Office Action dated Aug. 17, 2015 issued in counterpart application No. 2014-076778, 7 pages.

* cited by examiner

*Primary Examiner* — Erika A Washington
(74) *Attorney, Agent, or Firm* — The Farrell Law Firm, P.C.

(57) ABSTRACT

A method and apparatus for providing additional information in response to reception of an incoming call in a portable device are provided. The method includes searching, when an incoming call is received, for an identification of the incoming call and a log related to communication performed prior to reception of the incoming call, the communication-related log being stored in the portable device; and displaying, before call connection is performed in response to reception of the incoming call, the identification and the searched communication-related log together on a screen of the portable device.

18 Claims, 13 Drawing Sheets

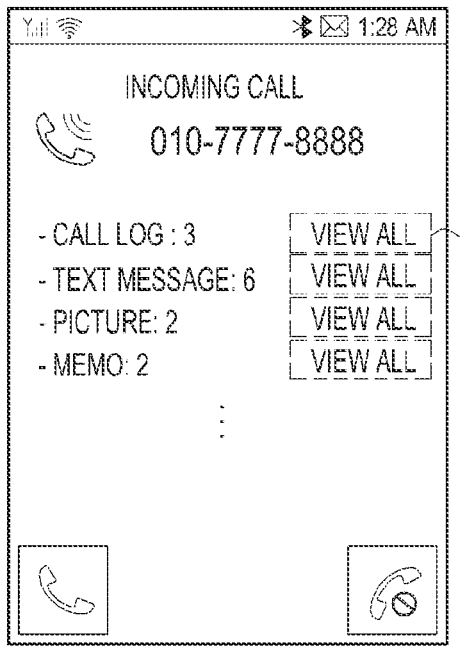
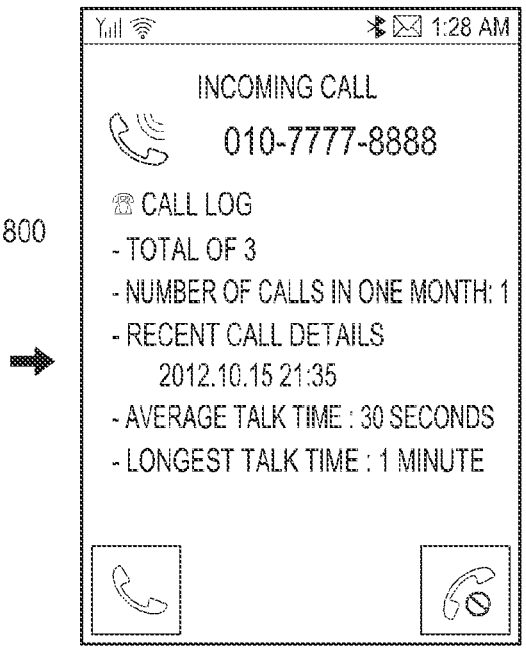
FIG.8A   FIG.8B
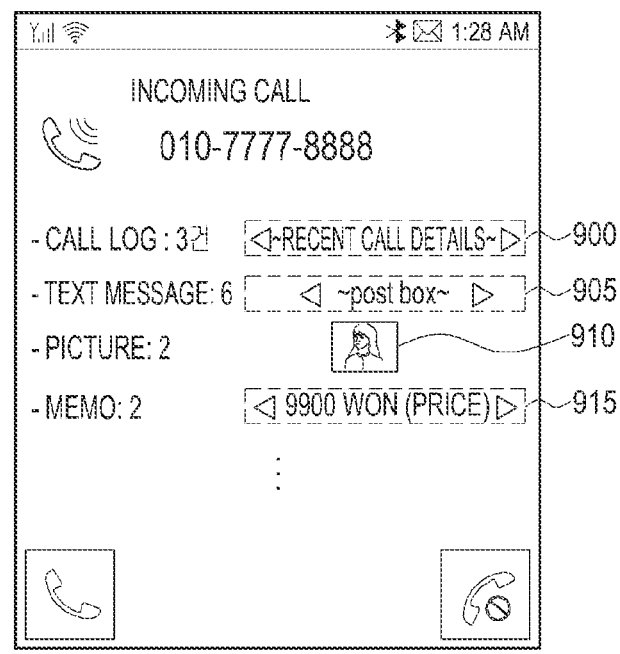
FIG.9

APPARATUS AND METHOD FOR PROVIDING ADDITIONAL INFORMATION BY USING CALLER PHONE NUMBER

PRIORITY

This application claims priority under 35 U.S.C. §119(a) to Korean Patent Application Serial No. 10-2013-0036935, which was filed in the Korean Intellectual Property Office on Apr. 4, 2013, the entire content of which is incorporated herein by reference.

BACKGROUND OF THE INVENTION

1. Field of the Invention

The present invention generally relates to an apparatus and method for providing information by using a caller phone number, and more particularly, to an apparatus and method for providing additional information regarding a caller phone number to allow a user to identify a caller corresponding to the caller phone number that is not registered in a phone directory.

2. Description of the Related Art

Recently, with popularization of portable devices, various additional services such as a caller IDentification (ID) service and a message call service, in addition to basic voice communication and text and voice message transmission services, have been provided to users of the portable devices. The message call service is a voice message service for converting input text to voice of a person through a Text-to-Speech (TTS) system and sending the converted voice to a counterpart user. Herein, the caller ID service displays, on a screen of a portable device, a phone number or a name of a caller who is calling a user of the portable device. The caller ID service allows the user to identify the phone number or name of the caller, and thus to avoid unwanted calls.

Generally, when a call is received, if the call is received from a phone number that has been previously registered in a phone directory, a name stored corresponding to the phone number is displayed, such as illustrated in FIG. 1A, allowing the user to easily identify a caller. However, if there isn't any name corresponding to the caller phone number stored in the phone directory, only the caller phone number is displayed, such as illustrated in FIG. 1B.

If there isn't any name corresponding to the caller phone number stored in the phone directory, and thus only the caller phone number is displayed, the user may not be able to easily identify the caller merely with the caller phone number. As a result, the user may answer the call without knowing whether the call comes from an acquaintance the user has not registered in the phone directory or the call is an advertising call or a voice phishing call. As such, a conventional caller ID service fails to provide a service that assists a user's reasonable judgment in avoiding unwanted calls, such as in case of phone fraud.

Moreover, for example, when a Social Network Service (SNS) application that interworks with the phone directory, such as Kakao Talk, is used, a phone number may be automatically added to a friend list of the application. In this case, even a caller who the user does not know well is added to the friend list. Therefore, through this automatic interworking, a picture or personal information that the user does not want to provide to the caller may be inadvertently exposed to the caller.

The above information is presented as background information only to assist with an understanding of the present invention. No determination has been made, and no assertion is made, as to whether any of the above might be applicable as prior art with regard to the present invention.

SUMMARY OF THE INVENTION

The present invention has been made to at least partially solve, alleviate, or remove at least one of problems and/or disadvantages described above, and to provide the advantages described below.

Accordingly, aspects of the present invention provide an apparatus and method for providing additional information regarding a caller phone number to allow a user to identify a caller corresponding to the phone number that is not registered in a phone directory.

Aspects of the present invention also provide an apparatus and method for providing additional information regarding a caller phone number by using various multimedia data such as images as well as text-based caller information to allow a user to identify a caller corresponding to the phone number.

According to an aspect of the present invention, a method for providing additional information in response to reception of an incoming call in a portable device is provided. The method includes searching, when an incoming call is received, for an identification of the incoming call and a log related to communication performed prior to reception of the incoming call, the communication-related log being stored in the portable device; and displaying, before call connection is performed in response to reception of the incoming call, the identification and the searched communication-related log together on a screen of the portable device.

According to another aspect of the present invention, a portable device for providing additional information is provided. The portable device includes a mobile communication module for receiving an incoming call; a storage unit for storing a log related to communication; a controller for detecting an identification of a caller from the received incoming call, and searching for a communication-related log matched to the identification from the storage unit; and a display for displaying, before call connection is performed in response to reception of the incoming call, the identification and the searched communication-related log together on an incoming call screen.

BRIEF DESCRIPTION OF THE DRAWINGS

The above and other aspects, features and advantages of a certain embodiment of the present invention will be more apparent from the following detailed description taken in conjunction with the accompanying drawings, in which:

FIGS. 8A and 8B are diagrams illustrating an incoming call screen that displays category-based additional information according to an embodiment of the present invention;

FIG. 9 is a diagram illustrating an incoming call screen that displays category-based additional information according to an embodiment of the present invention;

DETAILED DESCRIPTION OF THE EMBODIMENTS

Figure 1A:
FIG. 1A is a diagram illustrating a conventional incoming call screen when a caller phone number corresponding to an incoming call is previously registered in a phone directory.
Figure 1B:
FIG. 1B is a diagram illustrating a conventional incoming call screen when a caller phone number corresponding to an incoming call is not previously registered in a phone directory.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

As the present invention allows for various changes and numerous embodiments, particular embodiments will be illustrated in the drawings and described in detail. However, the present invention is not limited to the specific embodiments and should be construed as including all changes, equivalents, and substitutions included in the spirit and scope of the present invention.

Although ordinal numbers such as "first", "second", and so forth will be used to describe various components, those components are not limited by the terms, or the order of such terms. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing embodiments only and is not intended to be limiting of embodiments. As used herein, the singular forms are intended to include the plural forms as well, unless the context clearly indicates otherwise. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

Unless otherwise defined, all terms (including technical and scientific terms) used herein have the same meaning as commonly understood by one of ordinary skill in the art to which embodiments belong. It will be further understood that terms, such as those defined in commonly used dictionaries, should be interpreted as having a meaning that is consistent with their meaning in the specification with the context of the relevant art as understood by the artisan at the time of invention and will not be interpreted in an idealized or overly formal sense unless expressly so defined herein.

Throughout the drawings, like reference numerals may refer to like parts, components, and structures.

In the present invention, a portable device may be a device including a touch screen, and the portable device may be referred to as a portable terminal, a mobile terminal, a communication terminal, a portable communication terminal, or a portable mobile terminal.

For example, the portable device may be a smart phone, a cellular phone, a game console, a Television (TV), a display, a vehicle head unit, a notebook computer, a laptop computer, a tablet computer, a Personal Media Player (PMP), a Personal Digital Assistant (PDA), or the like. The terminal may be implemented with a pocket-size portable communication terminal having a wireless communication function. The terminal may be a flexible device or a flexible display.

A cellular phone is described herein as an example of a portable device according to embodiments of the present invention, and some components may be omitted or changed from the representative structure of the portable device in accordance with embodiments of the present invention.

Embodiments of the present invention provide a method for providing additional information regarding a caller phone number to allow a user to identify a caller. To this end, the present invention searches in the portable device for related additional information corresponding to a phone number of an incoming call when the call is received, and then displays the phone number together with the found related additional information. As such, according to embodiments of the present invention, when a call is received, additional information regarding the phone number of the call is displayed on an incoming call screen (or a call receiving screen), such that the user is able to directly check the additional information regarding the phone number of the call immediately before call connection. Therefore, efficiency of identification of a caller corresponding to the phone number is improved.

In addition, according to embodiments of the present invention, the user is able to easily identify a caller based on additional information even when it may be difficult for the user to accurately remember the caller corresponding to a phone number that is registered in a phone directory as well as a phone number that is not registered in the phone directory. Therefore, the user is able to selectively permit connection of the call received from the phone number.

Figure 2:
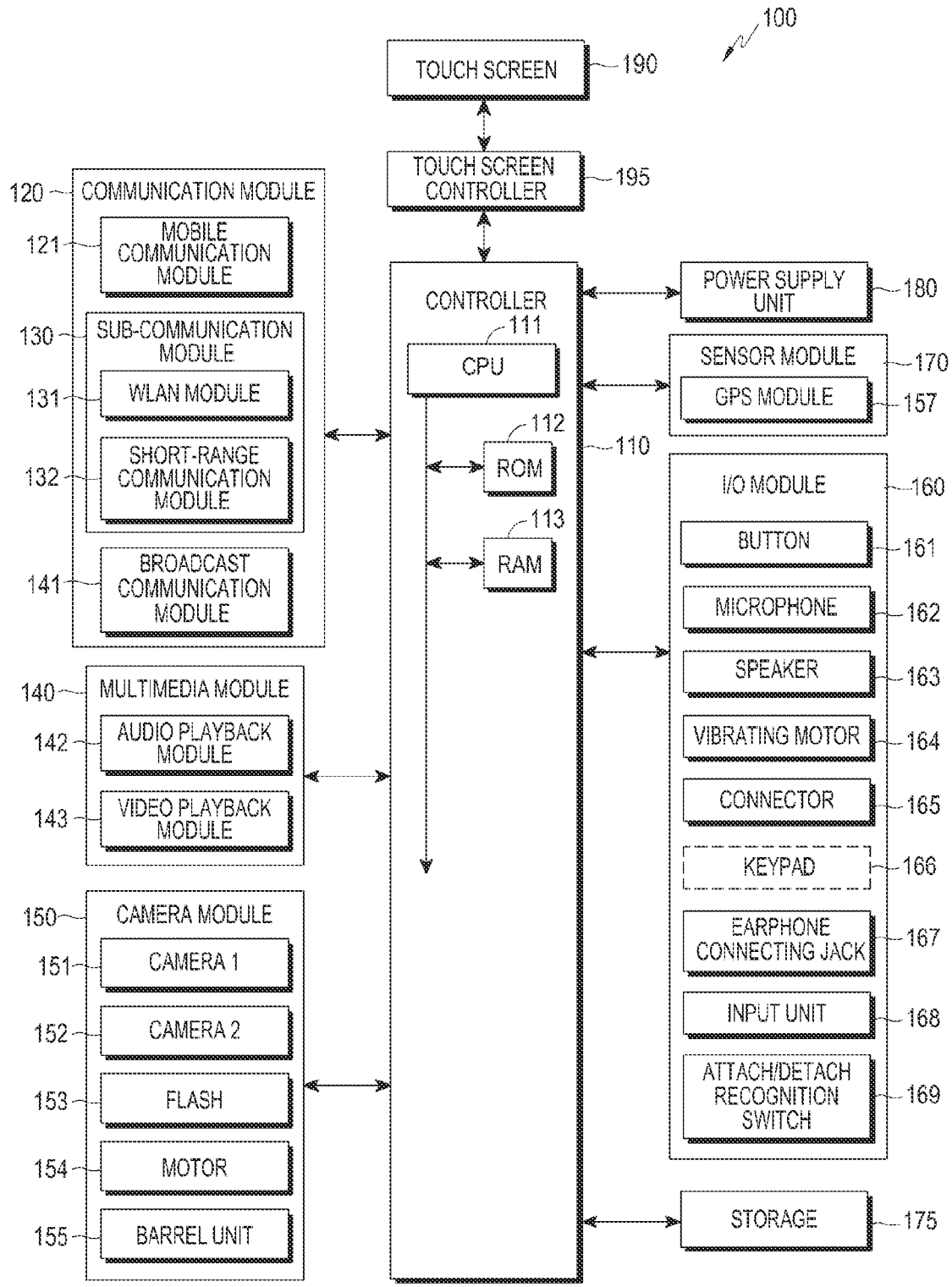
FIG. 2 is a block diagram illustrating a portable device according to an embodiment of the present invention.

FIG. 2 is a block diagram illustrating a portable device according to an embodiment of the present invention.

Referring to FIG. 2, a portable device 100 is able to connect to an external electronic device (not shown) using at least one of a communication module 120, a connector 165, and an earphone connecting jack 167. The external electronic device may include an earphone, an external speaker, a Universal Serial Bus (USB) memory, a battery charger, a Cradle/Dock, a Digital Multimedia Broadcasting (DMB) antenna, a mobile payment system, healthcare equipment (a blood glucose meter, etc.), a game, a vehicle navigation system, and the like, which can be removably connected to the portable device 100 through a line. Also, the electronic device may include a Bluetooth communication apparatus, a Near Field Communication (NFC) apparatus, a WiFi Direct communication apparatus, a Wireless Access Point (WAP), etc., which can be wirelessly connected to the portable device 100. Also, the portable device 100 may be connected to other portable or electronic devices (e.g., a mobile phone, a smart phone, a tablet PC, a desktop PC, a server, etc.) in a wired/wireless fashion.

Referring to FIG. 2, the portable device 100 includes a touch screen 190 and at least one touch screen controller 195. According to embodiment of the present invention, the touch screen 190 and the touch screen controller 195 are examples of a display and a display controller, respectively. Also, the portable device 100 further includes a controller 110, a communication module 120, a multimedia module 140, a camera module 150, an input/output module 160, a sensor module 170, a storage unit 175, and a power supply unit 180.

The controller 110 includes a Read Only Memory (ROM) 112 in which a control program for controlling the portable device 100 is stored, and further includes a Random Access Memory (RAM) 113 that memorizes a signal or data input from the outside of the portable device 100 or is used as a memory region for a task performed in the portable device 100. A Central Processing Unit (CPU) 111 may include a single core, a dual core, a triple core, or a quad core processor. The CPU 111, the ROM 112, and the RAM 113 may be interconnected through an internal bus.

The controller 110 controls the communication module 120, the multimedia module 140, the camera module 150, the input/output module 160, the sensor module 170, the storage unit 175, the power supply unit 180, the touch screen 190, and the touch screen controller 195.

The controller 110 senses a user input generated when a touchable user input means, such as an input unit 168, the user's finger, etc., touches one of a plurality of objects or items displayed on the touch screen 190, approaches the object, or is disposed in proximity to the object. The controller 110 also identifies the object corresponding to the position on the touch screen 190 where the user input is generated. The user input generated through the touch screen 190 includes one of a direct touch input for directly touching an object and a hovering input, which is an indirect touch input in which the object is approached within a preset recognizing distance but not directly touched. For example, when the input unit 168 is positioned close to the touch screen 190, an object positioned immediately under the input unit 168 may be selected. According to embodiments of the present invention, the user input may include a gesture input generated through the camera module 150, a switch/button input generated through the at least one buttons 161 or the keypad 166, and a voice input generated through the microphone 162 as well as the user input generated through the touch screen 190.

The object or item (or a function item) is displayed on the touch screen 190 of the portable device 100, and is at least one of, for example, an application, a menu, a document, a widget, a picture, a moving image, an e-mail, a Short Messaging Service (SMS) message, and a Multimedia Messaging Service (MMS) message, which may be selected, executed, deleted, canceled, stored, and changed using the user input means. The item may be any of a button, an icon (or a shortcut icon), a thumbnail image, and a folder including at least one object in the portable device 100. The item may be presented in the form of an image, a text, etc.

A shortcut icon is an image displayed on the touch screen 190 of the portable device 100 for quick execution of an application or a call, a contact number, a menu, etc. Upon input of a command or a selection for executing the shortcut icon, a corresponding application is executed.

The controller 110 senses a user input event, such as a hovering event, when the input unit 168 approaches the touch screen 190 or is disposed in proximity to the touch screen 190.

Upon generation of a user input event with respect to a preset item or in a preset manner, the controller 110 performs a preset program operation corresponding to the generated user input event.

The controller 110 may output a control signal to the input unit 168 or a vibration element 164. The control signal may include information about a vibration pattern. Either the input unit 168 or the vibration element 164 generates a vibration corresponding to the vibration pattern. The information about the vibration pattern may indicate either the vibration pattern or an identifier corresponding to the vibration pattern. The control signal may include a vibration generation request alone.

The communication module 120 includes a mobile communication module 121, a sub communication module 130, and a broadcast communication module 141.

The portable device 100 may include at least one of the mobile communication module 121, the Wireless Local Area Network (WLAN) module 131, and the short-range communication module 132.

The mobile communication module 121 facilitates the connection between the portable device 100 and an external electronic device through mobile communication by using one or more antennas (not illustrated) under control of the controller 110. The mobile communication module 121 transmits/receives a wireless signal for a voice call, a video call, a Short Message Service (SMS) message, and/or a MultiMedia Service (MMS) message with a cellular phone (not illustrated), a smart phone (not illustrated), a tablet Personal Computer (PC), or another electronic device (not illustrated) which has a phone number input into the portable device 100.

The sub communication module 130 includes at least one of the WLAN module 131 and the short-range communication module 132. Alternatively, the sub communication module 130 may include either the WLAN module 131 or the short-range communication module 132, or both.

The WLAN module 131 may be connected to the Internet in a place where a wireless AP (not illustrated) is installed, under control of the controller 110. The WLAN module 131 supports the wireless LAN standard IEEE802.11x of the Institute of Electrical and Electronics Engineers (IEEE). The short-range communication module 132 may wirelessly perform short-range communication between the portable device 100 and an external electronic device under control of the controller 110. The short-range communication may include Bluetooth, InfraRed Data Association (IrDA), WiFi-Direct communication, Near Field Communication (NFC), etc.

Through the sub communication module 130, the controller 110 may transmit a control signal for a haptic pattern to the input unit 168.

The broadcast communication module 141 receives a broadcast signal (for example, a TeleVision (TV) broadcast signal, a radio broadcast signal, or a data broadcast signal), and broadcast additional information (for example, Electric Program Guide (EPG) or Electric Service Guide (ESG) information) transmitted from a broadcasting station (not shown) via a broadcast communication antenna (not illustrated) under control of the controller 110.

The multimedia module 140 includes an audio playback module 142 or a video playback module 143. The audio playback module 142 may play a digital audio file (for example, a file having a file extension such as 'mp3', 'wma', 'ogg', or 'wav') stored in the storage unit 175 or received under control of the controller 110. The video playback module 143 may play a digital video file (for example, a file having a file extension such as 'mpeg', 'mpg', 'mp4', 'avi', 'mov', or 'mkv') stored or received under control of the controller 110.

The multimedia module 140 may be integrated into the controller 110.

The camera module 150 includes a first camera 151 and a second camera 152 which capture a still image or a video under control of the controller 110. The camera module 150 also includes a barrel unit 155 for performing the zoom-in/zoom-out operations for photographing, a motor 154 for controlling motion of the barrel unit 155, and a flash 153 for providing an auxiliary light source necessary for photographing. The first camera 151 may be positioned on the front surface of the portable device 100, and the second camera 152 may be positioned on the rear surface of the portable device 100.

The first camera 151 and the second camera 152 each include a lens system, an image sensor, etc. The first camera 151 and the second camera 152 convert an optical signal (input or captured) through the lens systems into an electric image signal and output the electric image signal to the controller 110. The user may capture a moving image or a still image through the first camera 151 and the second camera 152.

The input/output module 160 includes the at least one buttons 161, the microphone 162, the speaker 163, the vibration element 164, the connector 165, the keypad 166, the earphone connecting jack 167, and the input unit 168. However, the input/output module 160 is not limited to those examples, and a cursor control such as, for example, a mouse, a track ball, a joy stick, or a cursor direction key may be provided to control movement of a cursor on the touch screen 190.

The buttons 161 may be formed on at least one of a front surface, a side surface, and a rear surface of a housing (or case) of the portable device 100, and may include at least one of a power/lock button, a volume button, a menu button, a home button, a back button, and a search button.

The microphone 162 receives voice or sound and generates a corresponding electric signal under control of the controller 110.

The speaker 163 outputs sound corresponding to various signals or data (for example, wireless data, broadcast data, digital audio data, digital video data, or the like) under control of the controller 110. The speaker 163 may output sound corresponding to a function executed by the portable device 100 (for example, button manipulation sound corresponding to a phone call, a ring back tone, or voice of a counterpart user). One or more speakers 163 may be formed in a proper position or proper positions of the housing of the portable device 100.

The vibration element 164 converts an electric signal into mechanical vibration under control of the controller 110. For example, in the portable device 100, in a vibration mode, if a voice call or a video call from another device (not illustrated) is received, the vibration element 164 operates. One or more of the vibration element 164 may be disposed in the housing of the portable device 100. The vibration element 164 may operate in response to user input generated through the touch screen 190.

The connector 165 may be used as an interface for connecting the portable device 100 with an external electronic device (not illustrated) or a power source (not illustrated). Under a control of the controller 110, data stored in the storage unit 175 of the portable device 100 may be transmitted to an external electronic device or data may be received from the external electronic device through a wired cable connected to the connector 165. The portable device 100 receives power from the power source through the wired cable connected to the connector 165 or may charge a battery (not illustrated) by using the power source.

The keypad 166 receives key input from the user for control of the portable device 100. The keypad 166 includes a physical keypad (not illustrated) formed in the portable device 100 or a virtual keypad (not illustrated) displayed on the touch screen 190. The physical keypad (not illustrated) formed in the mobile portable device 100 may be excluded according to the capability or structure of the portable device 100.

An earphone (not illustrated) may be inserted into the earphone connecting jack 167 to be connected to the portable device 100.

The input unit 168 may be inserted into the portable device 100 for keeping, and when being used, may be withdrawn or separated from the portable device 100. In a region of an inner side of the portable device 100 into which the input unit 168 is inserted, an attach/detach recognition switch 169 is disposed to provide a signal corresponding to attachment or detachment of the input unit 168 to the controller 110. The attach/detach recognition switch 169 may be configured to directly or indirectly contact the input unit 168 when the input unit 168 is mounted. Thus, the attach/detach recognition switch 169 generates the signal corresponding to attachment or separation of the input unit 168 (that is, a signal for indicating the attachment or detachment of the input unit 168) based on whether it contacts the input unit 168, and outputs the signal to the controller 110.

The sensor module 170 includes at least one sensor for detecting a state of the portable device 100. For example, the sensor module 170 may include at least one of a proximity sensor for detecting the user's proximity with respect to the portable device 100, an illumination sensor (not illustrated) for detecting an amount of light around the portable device 100, a motion sensor (not illustrated) for detecting an operation of the portable device 100 (for example, rotation of the portable device 100 or acceleration or vibration applied to the portable device 100), a gyroscope for detecting a rotational motion of the portable device 100, an accelerometer for detecting an accelerating motion of the portable device 100, an a geo-magnetic sensor (not illustrated) for detecting a point of the compass by using the Earth's magnetic field, a gravity sensor for detecting a working direction of the gravity, an altimeter for measuring an atmospheric pressure to detect an altitude, and a Global Positioning System (GPS) module 157. The sensor module 170 may also include a camera sensor for sensing a user's gesture.

The GPS module 157 receives electric waves from a plurality of GPS satellites (not illustrated) in the Earth's orbit, and calculates a location of the portable device 100 by using a time of arrival from the GPS satellite (not illustrated) to the portable device 100.

The storage unit 175 stores a signal or data which is input/output corresponding to operations of the communication module 120, the multimedia module 140, the input/output module 160, the sensor module 170, or the touch screen 190, under control of the controller 110. The storage unit 175 may also store a control program and applications for control of the portable device 100 and/or the controller 110.

The term "storage unit" includes the storage unit 175, the ROM 112 and the RAM 113 in the controller 110, or a memory card (not illustrated) mounted in the portable device 100 (for example, a Secure Digital (SD) card, a memory stick). The storage unit 175 may include a non-volatile memory, a volatile memory, a Hard Disk Drive (HDD), or a Solid State Drive (SSD).

The storage unit 175 may also store applications of various functions such as navigation, video communication, games, an alarm application based on time, images for providing a Graphic User Interface (GUI) related to the applications, user information, documents, databases or data related to a method for processing touch inputs, background images (for example, a menu screen, a standby screen, and so forth), operation programs necessary for driving the portable device 100, and images captured by the camera module 150.

The storage unit 175 is a machine, such as, for example, a non-transitory computer-readable medium. The term "machine-readable medium" includes a medium for providing data to the machine to allow the machine to execute a particular function. The storage unit 175 may include non-volatile media or volatile media. Such a medium includes a tangible type of medium, so that commands delivered to the medium can be detected by a physical tool that reads the commands with the machine.

The machine-readable medium may include, but is not limited to, at least one of a floppy disk, a flexible disk, a hard disk, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), and a flash EPROM.

The power supply unit 180 supplies power to one or more batteries disposed in the housing of the portable device 100 under control of the controller 110. The one or more batteries supply power to the portable device 100. The power supply unit 180 may also supply power input from an external power source through the wired cable connected with the connector 165 to the portable device 100. The power supply unit 180 may also supply power, which is wirelessly input from an external power source using a wireless charging technique, to the portable device 100.

The portable device 100 includes the touch screens 190, which provide a graphical user interface corresponding to various services (e.g., call, data transmission, broadcasting, picture taking) to users.

The touch screen 190 outputs an analog signal, which corresponds to at least one input to the user graphic interface, to the touch screen controller 195. The touch screen 190 receives at least one user inputs through a user's body (for example, a finger including a thumb) or the input unit 168 (for example, a stylus pen or an electronic pen). The touch screen 190 may also receive continuous movement of one touch (i.e., a drag input). The touch screen 190 may output an analog signal corresponding to the input continuous movement of the touch to the touch screen controller 195.

In the present invention, a touch may also include a non-contact touch (for example, when the user input means is positioned within a distance of, for example, 1 cm), in which the user input means may be detected without a direct contact with the touch screen 190. The touch may also include a direct contact between the touch screen 190 and a finger or the input unit 168. A distance or interval from the touch screen 190 within which the user input means may be detected may be changed according to the capability or structure of the portable device 100. In particular, to separately detect a direct touch event based on a contact with the user input means and an indirect touch event (that is, a hovering event), the touch screen 190 may be configured to output different values for values (for example, an analog voltage value or current value) detected in the direct touch event and the hovering event.

The touch screen 190 may be implemented as, for example, a resistive type screen, a capacitive type screen, an infrared type screen, an acoustic wave type screen, or a combination thereof.

The touch screen 190 may include at least two touch panels capable of sensing a touch, an approach of a finger, or the input unit 168 to receive inputs generated by the finger or the input unit 168. The at least two touch panels provide different output values to the touch screen controller 195. Thus, the touch screen controller 195 differently recognizes the values input from the at least two touch screen panels to identify whether the input from the touch screen 190 is the input generated by the finger or by the input unit 168.

The touch screen controller 195 converts the analog signal received from the touch screen 190 into a digital signal and transmits the digital signal to the controller 110. The controller 110 controls the touch screen 190 by using the digital signal received from the touch screen controller 195. For example, the controller 110 may control a shortcut icon (not illustrated) displayed on the touch screen 190 to be selected or executed in response to a direct touch event or a hovering event. The touch screen controller 195 may be included in the controller 110.

The touch screen controller 195, by detecting a value (for example, an electric-current value) output through the touch screen 190, recognizes a hovering interval or distance as well as a user input position and converts the recognized distance into a digital signal (for example, a Z coordinate), which the touch screen controller 195 then sends to the controller 110. The touch screen controller 195 may also, by detecting the value output through the touch screen 190, detect a pressure applied by the user input means to the touch screen 190, convert the detected pressure into a digital signal, and provide the digital signal to the controller 110.

The controller 110 detects various user inputs received through the camera module 150, the input/output module 160, and the sensor module 170 as well as the touch screen 190. The user inputs may include, in addition to touches, various forms of information input to the portable device 100, such as user's gesture, voice, eye movement, and biomedical signal. The controller 110 may control the overall operation of the portable device 100 to perform a predetermined operation or function corresponding to the detected user input.

Figure 3:
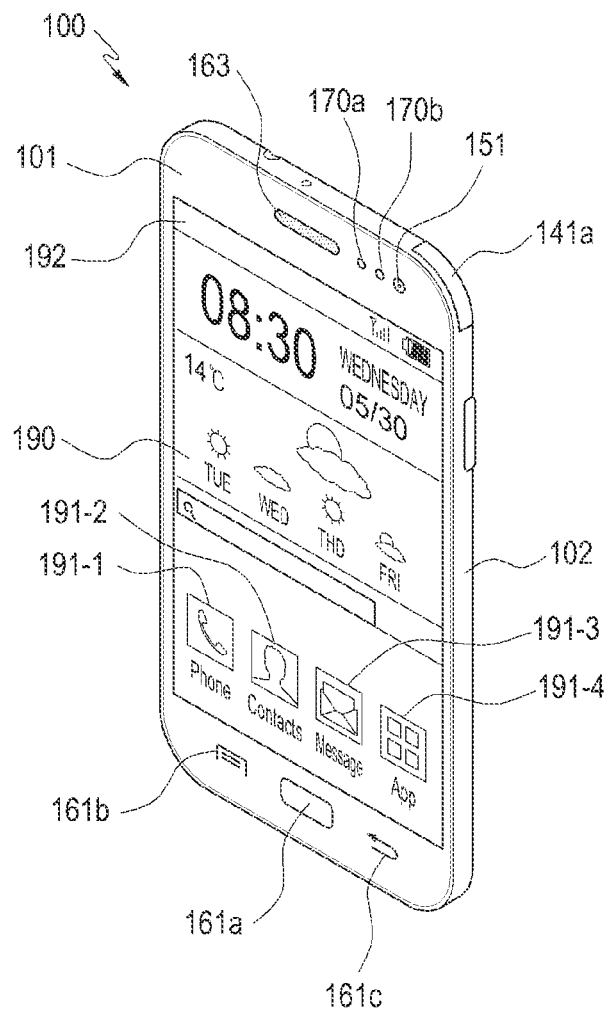
FIG. 3 is a front perspective view illustrating a portable device according to an embodiment of the present invention.
Figure 4:
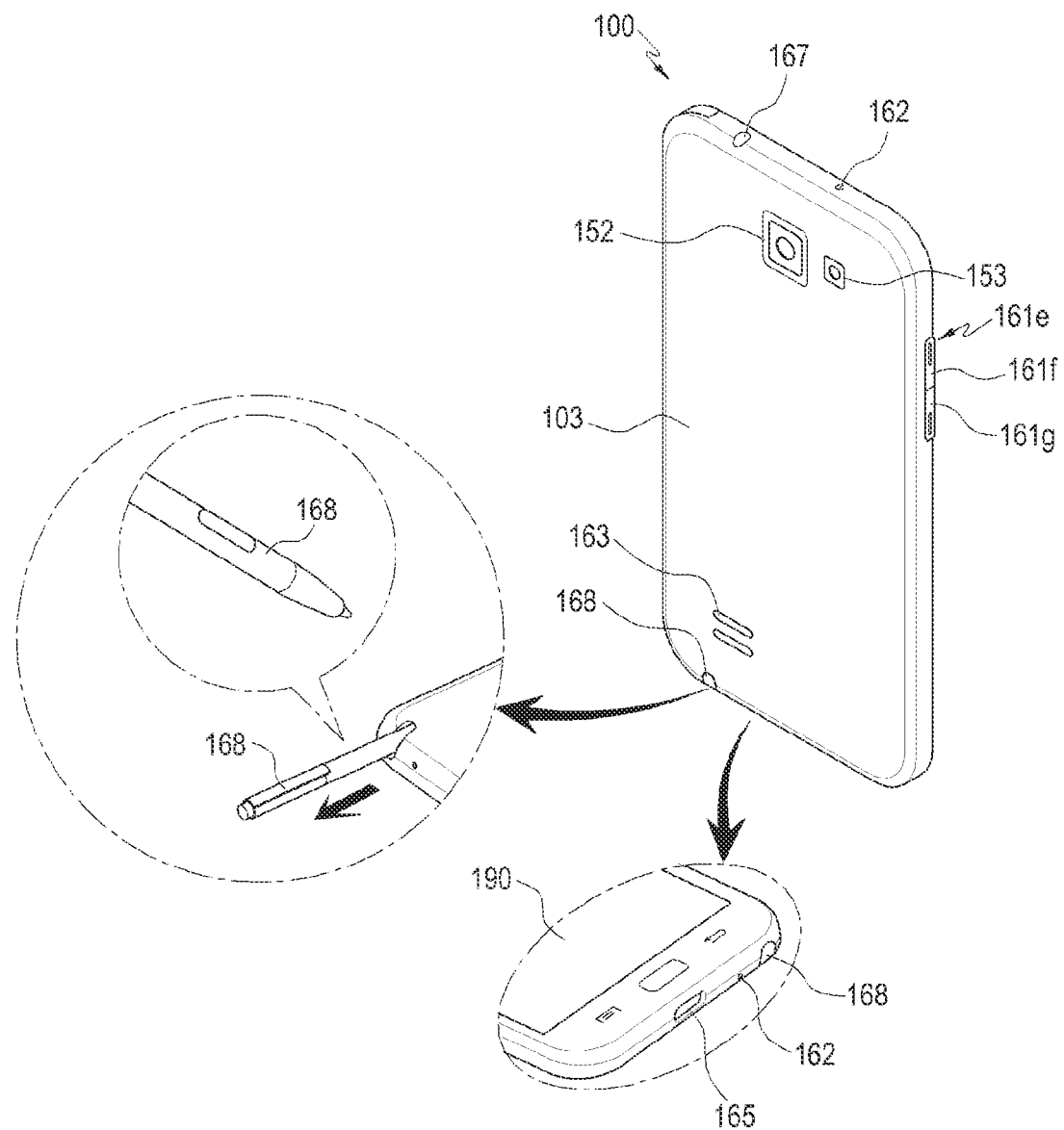
FIG. 4 is a rear perspective view illustrating a portable device according to an embodiment of the present invention.

FIG. 3 is a front perspective view illustrating the portable device 100 according to an embodiment of the present invention, and FIG. 4 is a rear perspective view illustrating the portable device 100 according to an embodiment of the present invention.

Referring to FIGS. 3 and 4, the touch screen 190 is disposed in the center of a front surface 101 of the portable device 100. The touch screen 190 may be large enough to occupy most of the front surface 101 of the portable device 100. FIG. 3 shows an example in which a main home screen is displayed on the touch screen 190. The main home screen is an initial screen displayed on the touch screen 190 when the portable device 100 is powered on. When the portable device 100 has different home screens of several pages, the main home screen may be the first home screen among the home screens of the several pages. Shortcut icons 191-1, 191-2, and 191-3 for executing frequently used applications, a main menu change key 191-4, time, weather, and so forth may be displayed on the home screen. If the user selects the main menu change key 191-4, a menu screen is displayed on the touch screen 190. A status bar 192 indicating a state of the portable device 100, such as a battery charge state, a strength of a received signal, and a current time, may be formed in an upper portion of the touch screen 190.

In a lower portion of the touch screen 190, a home button 161a, a menu button 161b, and a back button 161c may be disposed.

The home button 161a is intended to display the main home screen on the touch screen 190. For example, when any home screen, which is different from the main home screen, or a menu screen is displayed on the touch screen 190, the main home screen may be displayed on the touch screen 190 upon selection of the home button 161a. If the home button 161a is selected during execution of applications on the touch screen 190, the main home screen illustrated in FIG. 2 may be displayed on the touch screen 190. The home button 161a may be used to display recently used applications or a task manager on the touch screen 190.

The menu button 161b provides a connection menu, which may be displayed on the touch screen 190. The connection menu may include, for example, a widget add menu, a background change menu, a search menu, an edit menu, and an environment setting menu.

The back button 161c may be used to display a screen, which may be displayed immediately before the currently executed screen, or to terminate the most recently used application.

The first camera 151, an illumination sensor 170a, and a proximity sensor 170b may be disposed on an edge of the front surface 101 of the portable device 100. The second camera 152, the flash 153, and the speaker 163 may be disposed on a rear surface 103 of the portable device 100.

A power/lock button 161d, a volume button 161e including a volume-up button 161f and a volume-down button 161g, a terrestrial DMB antenna 141a for broadcasting reception, and one or more microphones 162 may be disposed on a lateral surface 102 of the portable device 100. The DMB antenna 141a may be fixed to or removable from the portable device 100.

The connector 165, in which multiple electrodes are formed and may be connected with an external device in a wired manner, may be formed in a lower-end lateral surface of the portable device 100. The earphone connecting jack 167, into which the earphone may be inserted, may be formed in an upper-end lateral surface of the portable device 100.

The input unit 168, which may be stored by being inserted into the portable device 100 and may be withdrawn and separated from the portable device 100 for use, may be mounted/formed on the lower-end larger surface of the portable device 100.

According to an embodiment of the present invention, when a call is received, related additional information mapped to a phone number corresponding to the incoming call is searched for and the phone number is output together with the related additional information. According to another embodiment of the present invention, when a call is received, a phone number corresponding to the incoming call is first output, and if an additional information view request regarding the phone number is generated, related additional information matched to the phone number is searched for and the additional information is output together with the output phone number. According to still another embodiment of the present invention, related additional information matched to a phone number corresponding to an incoming call is searched for and then the found additional information is stored to be matched to the phone number if a missed call is received. If a missed call check request is generated, the phone number is output together with the found additional information.

The controller 110 controls the overall operation of the portable device 100. The controller 110 controls other components of the portable device 100 to execute a method for providing additional information related to an identification of a caller when an incoming call is received. The controller 110 searches, when an incoming call is received, for an identification of the incoming call and a log related to communication performed prior to reception of the incoming call, the communication-related log being stored in the portable device. The controller 110 controls display of, before call connection is performed in response to reception of the incoming call, the identification and the searched communication-related log together on an incoming call screen. Herein, the additional information related to the identification refers to communication-related log information regarding communication that is executed prior to reception of a call from the identification, in which the communication-related log information is previously stored in relation to the identification in the portable device 100. The communication-related log information may include any data generated in relation to a caller phone number, such as a history of calls received from and transmitted to a caller phone number (or call detail information), text messages received from and transmitted to the caller phone number (or text message information), a file attached to a text message, images related to the caller phone number (or image file information), images captured immediately before or after a call is performed with respect to the caller phone number, details of Internet accesses related to the caller phone number (or Internet access detail information), for example, details of Internet accesses made immediately before or after a call made at the caller phone number or details of Internet accesses based on URL information included in a text message, and text information, for example, a memo generated during or immediately before or after a call made at the caller phone number. Also, according to embodiments of the present invention, the identification can be a caller ID, an e-mail, a counterpart phone number from which an incoming call is received by the user's portable device 100, and may also be referred to as a received phone number, an incoming phone number, or a counterpart phone number herein.

Figure 5A:
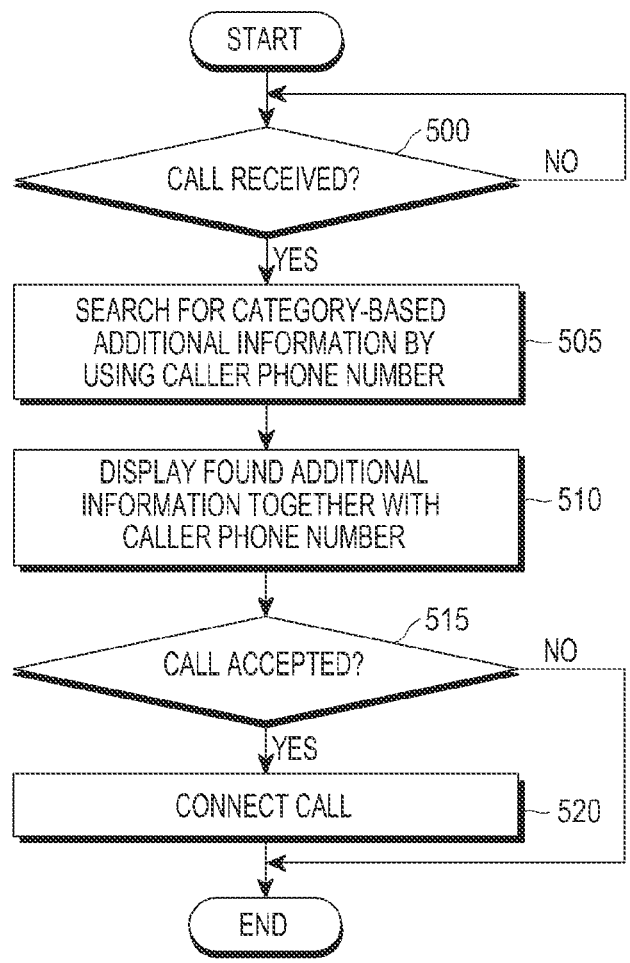
FIG. 5A is a flowchart illustrating a method for providing additional information by using a caller phone number when a call is received according to an embodiment of the present invention.

FIG. 5A is a flowchart illustrating a method for providing additional information by using a caller phone number when a call is received according to an embodiment of the present invention.

Referring to FIG. 5A, in step 500, if an incoming call is received through the mobile communication module 121, the controller 110 searches for additional information for each category (or category-based additional information) stored in the portable device 100 (i.e., in the storage unit 175) by using a caller phone number, in step 505. The category-based additional information may be searched for by searching for additional information for each category in real time or by using a database that is established previously by storing communication-related log information regarding communication that is executed prior to reception of a call from a corresponding caller phone number with respect to each of a plurality of caller phone numbers, as described herein below.

If the additional information related to the caller phone number is found in step 505, the controller 110 displays the found additional information together with the caller phone number on a screen of the portable device 100, prior to performing call connection with the caller phone number in response to the reception of the call, in step 510. Herein, the screen displayed prior to the call connection is referred to as an incoming call screen (or a call receiving screen). If there an input for call acceptance is received from a user in step 515, the call is connected in step 520. Otherwise, if there is no input for call acceptance from the user (i.e., if the call is declined or missed), in step 515, the process is ended.

While the additional information related to the caller phone number is immediately searched for when the call is received in FIG. 5A, according to an embodiment of the present invention, when the call is received, the caller phone number is displayed first, and at the request of a user, the additional information found in relation to the caller phone number is additionally displayed together with the displayed caller phone number, such as described herein below with reference to FIG. 5B.

Figure 5B:
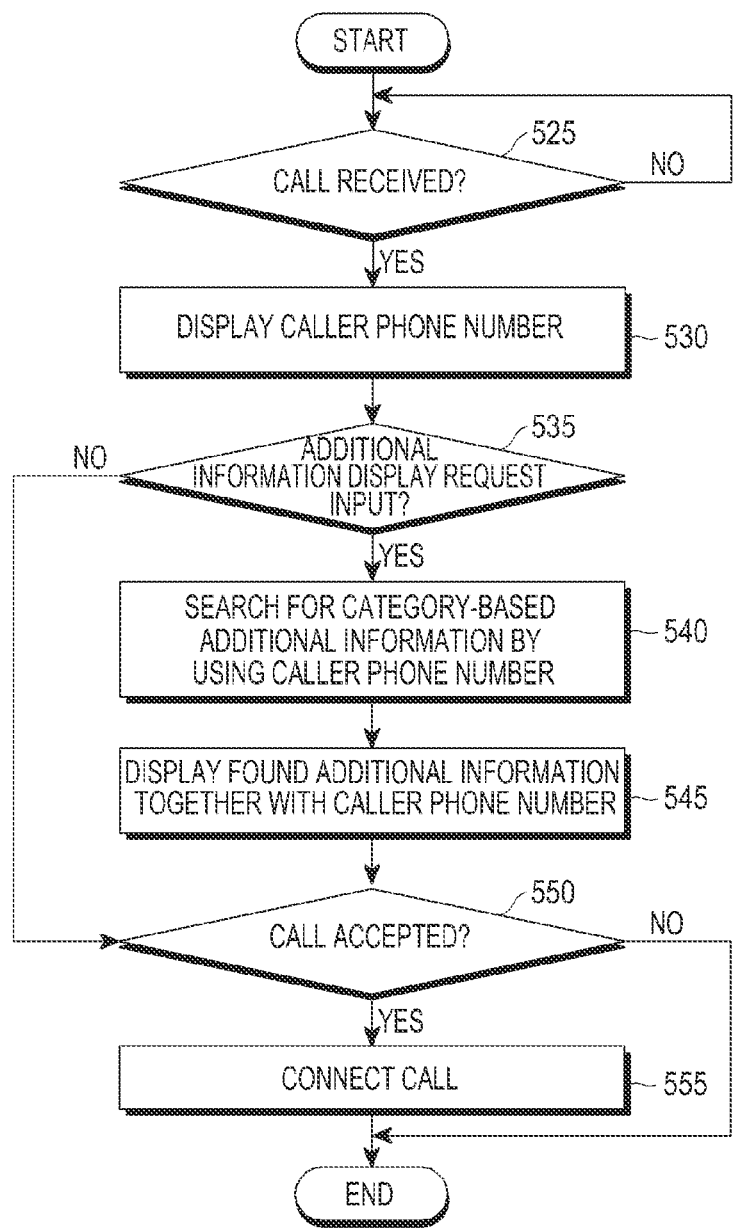
FIG. 5B is a flowchart illustrating a method for providing additional information by using a caller phone number when a call is received according to another embodiment of the present invention.

FIG. 5B is a flowchart illustrating a method for providing additional information by using a caller phone number when a call is received according to another embodiment of the present invention.

Referring to FIG. 5B, when a call is received in step 525, a caller phone number corresponding to the call is displayed in step 530. On the incoming call screen on which the caller phone number corresponding to the call is displayed, a visual object for requesting display of additional information is provided. Herein, the visual object may be displayed in various forms, such as an icon, an image, a text, etc. In step 535, portable device 100 determines whether a request for displaying additional information (or an additional information display request) is input. More specifically the portable device 100 determines whether there is a user input for selecting the visual object on the incoming call screen. If the additional information display request is input, the portable device 100 searches for category-based additional information by using the caller phone number in step 540, and additionally displays the additional information related to the caller phone number together with the displayed caller phone number, in step 545. The search operation of step 540 is the same as that of step 505 of FIG. 5A, and steps 550 and 555 are also the same as steps 515 and 520 of FIG. 5A and thus are not be described in further detail for clarity and conciseness.

For example, when receiving a call from a phone number that is not registered in a phone directory, but that the user knows, the user does not need to view additional information regarding the phone number. Therefore, an embodiment of the present invention allows the user to select display of the additional information on the incoming call screen. Moreover, when the user cannot identify a caller merely with caller's name and phone number displayed on the incoming call screen, such as when the caller has the same name corresponding to another phone number registered in the phone directory, the user is able to easily identify the caller by providing input for selecting display of additional information related to the displayed caller phone number.

If the caller phone number has not been registered in the phone directory, in step 510 of FIG. 5A and in step 545 of FIG. 5B, the incoming call screen including the caller phone number and the additional information is displayed. However, if the caller phone number has already been registered in the phone directory, the incoming call screen including the caller's name and phone number and the additional information may be displayed. If several hundreds of contacts exist in the phone directory, the user may not accurately remember the caller, even when the caller's name is displayed together with the caller's phone number. However, according to an embodiment of the present invention, by displaying additional information together, the user is assisted in accurately identifying the caller in a manner that distinguishes the caller from a different person of the same name, or whom the user cannot remember.

Figure 6:
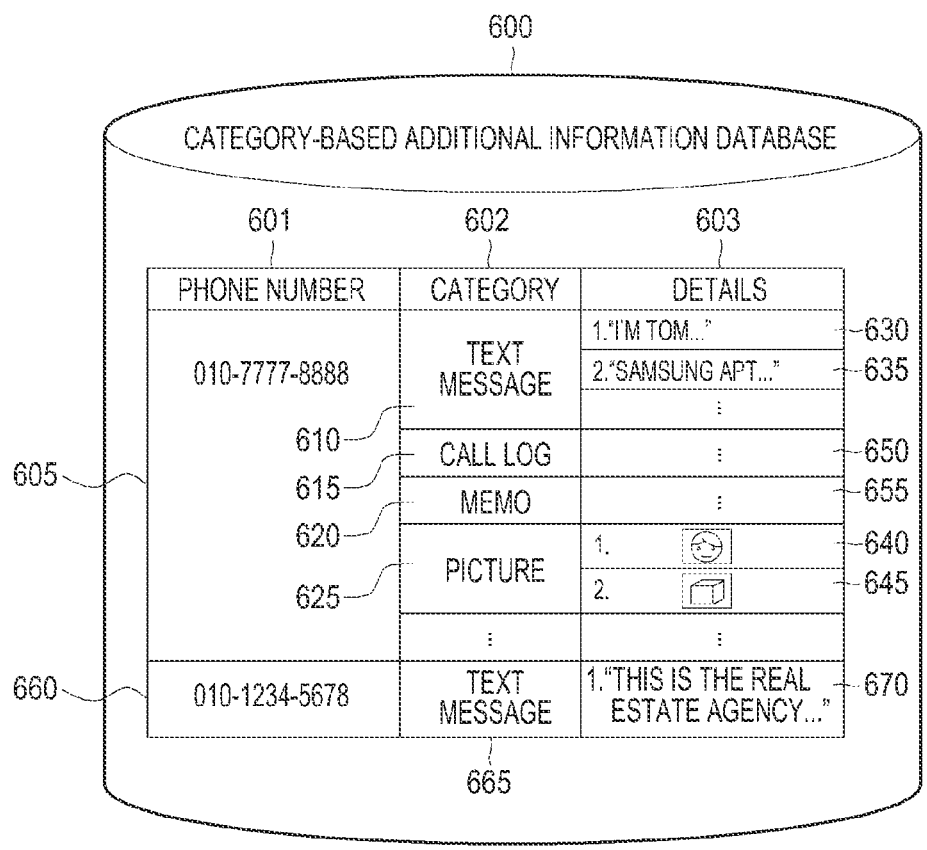
FIG. 6 is a diagram illustrating a category-based additional information database according to an embodiment of the present invention.

First, in one example scheme for searching for category-based additional information according to an embodiment of the present invention, a database that stores information in the portable device 100 is used by matching the information to each phone number, such as illustrated in FIG. 6. Using the database facilitates the search for the additional information for each phone number.

FIG. 6 illustrates a category-based additional information DataBase (DB) 600, which may be implemented in the storage unit 175. The DB 600 stores each caller phone number and logs related to communication executed prior to reception of a call for each caller phone number. For example, the DB 600 has a structure in which details (as shown under details item 603) belonging to one or more categories (as shown under category item 602) are mapped to a phone number (under shown in phone number item 601). Herein, a phone number belonging to the phone number item 601 in the DB 600 is a phone number related to occurrence of an event such as call transmission/reception and/or text message transmission/reception. Upon occurrence of an event, a corresponding phone number is added to the DB 600.

In FIG. 6, for a phone number 605 '010-7777-8888', upon occurrence of an event such as text message transmission/reception, call transmission/reception, memo generation, picture storage, or the like, one or more details are sorted according to each category such as text message 610, call log 615, memo 620, picture 625, etc. For example, for a phone number 660 '010-1234-5678', upon occurrence of a text message transmission/reception event, received or transmitted message data 670 belongs to a text message category 665 as detail information.

Detail information 650 of the call log category 615 may be sorted according to time order. The detail information 650 belonging to the call log category 615 may include recent call details, the number of calls made at a corresponding caller phone number, the number of calls made at a corresponding caller phone number within recent one month, an average talk time, and the longest talk time, for example. Thus, the portable device 100 may display at least one of the detail information 650 belonging to the call log category 615, together with the caller phone number.

The text message category 610 includes transmitted and received messages. Detail information belonging to the text message category 610 may include the number of messages transmitted and received in relation to a caller phone number, the number of messages transmitted and received in relation to a caller phone number within recent one month, recent message transmission/reception details, key words, etc.

As such, transmitted/received messages belong to the text message category 610 and they are generally sorted according to time order or priority order. For example, if a key text message or a key word is first displayed together with a caller phone number, the user is able to more easily identify a caller. In this regard, the order of priorities of messages belonging to the text message category 610 may be determined according to words included in the messages. For example, character recognition may be used to determine whether a key word corresponding to a name, an address, or URL information is included in a message, such that messages may be sorted in the order of a message 630 including a name and then a message 635 including an address. A key word may be set during manufacturing of the portable device 100 or arbitrarily by a user.

Memo details 655 belonging to the memo category 615 may also be sorted in the same manner as the text message category 610. A memo may be generated during a call made at a caller phone number, for example, to take notes of a phone number, or may be stored for the caller phone number a predetermined time ago or later from the call.

Detail information belonging to the picture category 625 includes image files. For example, image files may include a picture file attached for the caller phone number or a picture taken a predetermined time before or after a call made with the caller phone number. Most pictures taken a predetermined time before or after a call may be related to surrounding persons, places, locations, circumstances, or the like during the call made at the phone number. If the user can see an image related to the caller phone number together with the caller phone number, this may help the user identify the caller. The order of sorting image files may also be determined according to the order of priorities. For example, if a person's face is included in a picture, the controller 110 may extract only the person's face using a face recognition algorithm and map and store the extracted face to a corresponding phone number of the DB 600. Thus, image files belonging to the picture category 625 may be sorted in the order of a person image 640 followed by an object image 645.

While categories such as text message, call log, memo, and picture are used as examples in the foregoing description, examples of categories multimedia data displayed together with a caller phone number to allow the user to guess a caller in relation to the caller phone number are not limited to those examples. For example, Internet access details may be added as a category. Herein, if URL information is included in a text message, the Internet access details may include information regarding Internet accesses based on the URL information and URL information used for Internet accesses a predetermined time before or after a call is performed with respect to a caller phone number.

The DB 600 may be updated periodically/aperiodically or at the request of the user.

In another scheme for searching for category-based additional information according to an embodiment of the present invention, the additional information may be searched for in real time. A communication log DB (not illustrated) is implemented in the storage unit 175, and stores therein various communication logs regarding outgoing voice calls, incoming voice calls, transmitted text messages, received text messages, a response time to a voice call, a response time to a text message, the number of missed calls, sizes of the transmitted and received text messages, etc. By applying a data mining scheme to various multimedia data such as pictures, memos, and videos stored in the portable device 100, an additional DB as well as a communication log DB may be established. Through establishment of the DB, additional information in various forms related to caller phone numbers used in the present invention may be generated. The controller 110 basically uses information of the communication log DB and merely performs a subsequent process to acquire additional information related to caller phone numbers.

More specifically, the controller 110 extracts additional information corresponding to a caller phone number from communication logs stored in the communication log DB before displaying the caller phone number corresponding to an incoming call when the call is received. More specifically, the controller 110 extracts a communication log related to the caller phone number, which is stored in the communication log DB. The extracted communication log may be used as additional information related to the caller phone number, or additional information related to the caller phone number may be newly configured based on the extracted communication log. Additional information in multimedia data forms other than the additional information associated with the communication log may be extracted using an additionally established DB. For example, a gallery-related DB stores image files and video files, such that if caller phone numbers are added to metadata indicating attributes of image files and video files and stored in the form of an additional DB, the user is able to easily search for additional information related to caller phone numbers.

Once additional information is found by using the category-based additional information search schemes described above, the found additional information is displayed together with a caller phone number on an incoming call screen. Incoming call screens according to embodiments of the present invention are illustrated in FIGS. 7A through 7D.

In FIGS. 7A through 7D, category-based additional information, such as call detail information, text message information, text information, and image file information are classified into respective pages, one of which is displayed on the incoming call screen. If there is a user input for viewing a page that is different from the currently displayed page, the page corresponding to the user input is displayed on the incoming call screen. In another example according to embodiments of the present invention, the pages may be automatically and sequentially displayed by automatic setting.

Figures 7A, 7B:
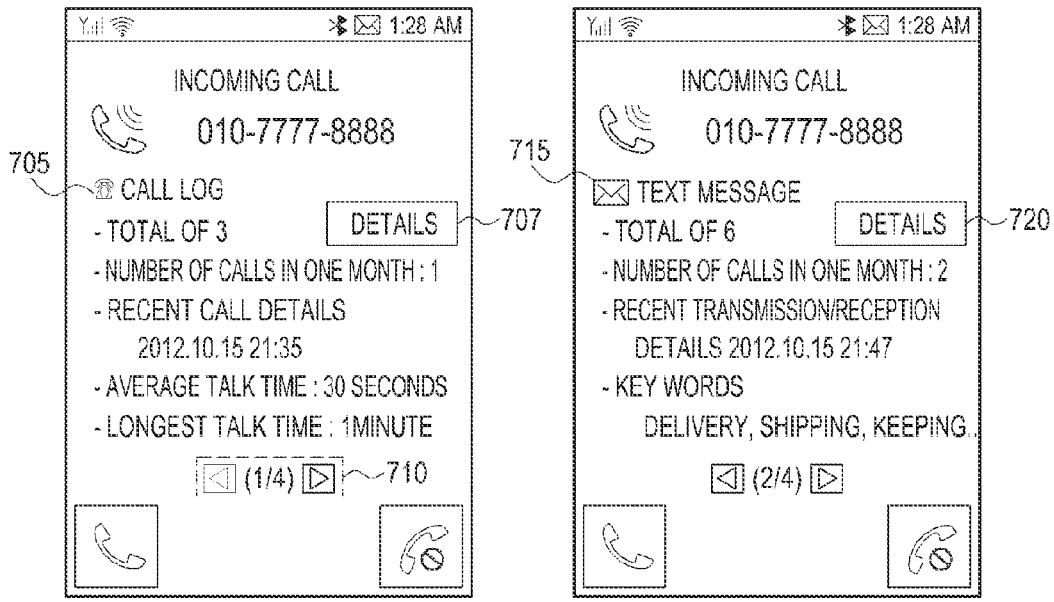
FIGS. 7A through 7D are diagrams illustrating an incoming call screen that displays category-based additional information according to an embodiment of the present invention.

First, in FIG. 7A, an incoming call screen, in which additional information using a call log category 705 related to a caller phone number, is displayed when a call is received. For example, when a call comes from a phone number '010-7777-8888', call details related to the caller phone number are displayed. Additional information using the call log category 705 (i.e., call details) may include at least one of, but not limited to, a total number of calls, the number of calls within recent one month, recent call details, an average talk time, and the longest talk time, as illustrated in FIG. 7A. The additional information indicates, not only that the current call from the caller phone number is not the first call from the caller phone number, but also an amount of time that has passed from the last call and the length of time that a call with the caller is maintained on average. Hence, the user is informed of whether an incoming call is an important call, originates from a frequently used phone number, or is an advertising call, thus enabling a user in selecting whether to connect the call.

Moreover, due to the limited size of the incoming call screen, some call details may not be displayed on the incoming call screen, such that a visual object 707 for showing details may be displayed on the incoming call screen as illustrated in FIG. 7A. Herein, the visual object 707 may be displayed in various forms such as an icon, an image, a text, etc. Additional information may also be searched for in one or more categories (i.e., in another category in addition to a call log category), in relation to the caller phone number. In this case, a visual object 710 for moving the screen to the left or to the right of the incoming call screen is also displayed. To see additional information corresponding to the next category, if there is a user input for moving the screen to the next screen by a dragging gesture with an input means, for example, with a user's touch, or there is a user touch input for selecting the visual object 710, an incoming call screen corresponding to the next category is displayed, as illustrated in FIG. 7B. In another example according to embodiments of the present invention, only a visual object indicating presence of additional information without displaying details of the additional information to the user is initially displayed, and the details of the additional information are displayed after the user selects the visual object.

FIG. 7B illustrates an incoming call screen that displays additional information using a text message category 715 related to a caller phone number when a call is received. The additional information using the text message category 715 (i.e., text message information), may include at least one of, but not limited to, a total number of transmitted and received messages, the number of transmitted and received messages within recent one month, recent transmission and reception details, key message details, and key words, as illustrated in FIG. 7B. As such, a page classified as the text message information includes full details of the text message or found key words of the text message.

For example, if '010-7777-8888' is a phone number of a delivery service man, words related to delivery are obtained as key message details or key words. By showing the key message details or the key words, the user is better able to determine whether the phone number is that of a delivery service provider, with merely details or words of the message even if the phone number is not registered in a phone directory. Details of each text message may be output upon selection of a visual object 720.

Figures 7C, 7D:
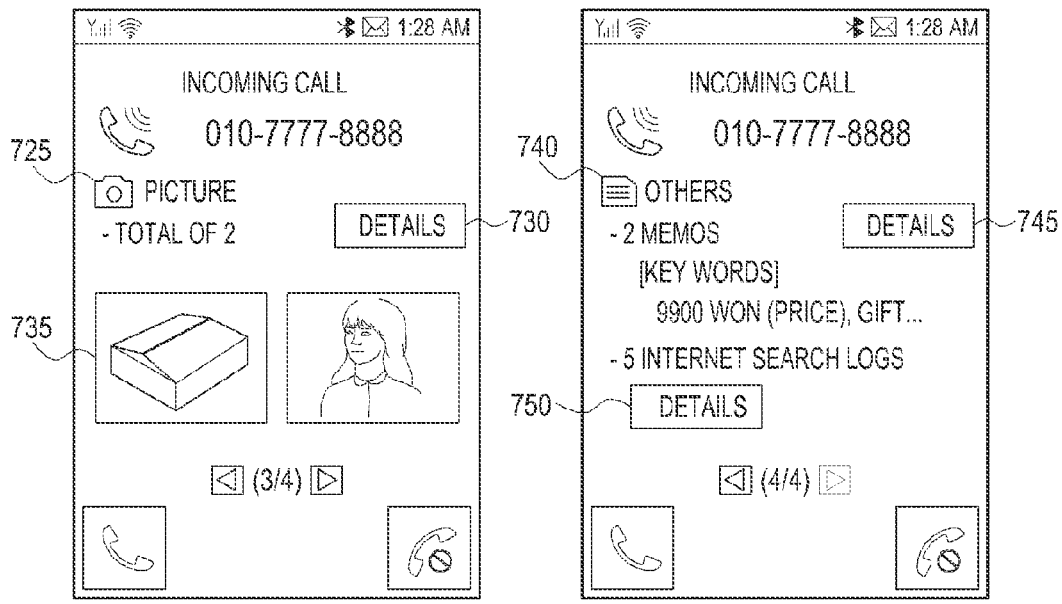

FIG. 7C illustrates an incoming call screen that displays pictures 732 and 735 found in a picture category 725 related to a caller phone number as additional information when a call is received. Additional information belonging to the picture category 725 (i.e., image file information) includes at least one of pictures attached to a text message related to the caller phone number and pictures taken before or after calls made at the caller phone number, as illustrated in FIG. 7C. In order to allow the user to remember a caller, an image that extracts an object such as a person's face, a particular object, a building, etc., from a taken picture is output together with the caller phone number. Details related to pictures are output by selection of a visual object 730.

FIG. 7D illustrates an incoming call screen that displays other information found in an others category 740 related to a caller phone number as additional information when a call is received. The additional information belonging to the others category 740 may include text information such as memo details, Internet access details, etc., as illustrated in FIG. 7D. Herein, a page classified as the text information includes full details of the text or found key words of the text on the page showing the text message. In another example, as illustrated in FIG. 7D, memo details may be displayed by selection of a visual object 745 and Internet access details may also be displayed by selection of a visual object 750.

As in the others category 740, various multimedia data generated before or after calls made at the caller phone number are used as additional information. For example, information in various text file forms, such as information related to the caller phone number, which is registered in a scheduler, as well as memos generated during calls made at the caller phone number, may also be used. Moreover, Internet access details such as Internet access logs immediately before or after the calls are performed with respect to the caller phone number or URL information included in text messages transmitted to or received from the caller phone number may also be used. Furthermore, various multimedia data, such as voice files that record calls made at the caller phone number and video files that record video communication made at the caller phone number may also be used.

While additional information corresponding to one category at a time is displayed on the screen in FIGS. 7A through 7D, additional information corresponding to all categories may also be displayed at one time, together with a caller phone number on the screen, such as illustrated in FIGS. 8A and 8B.

FIGS. 8A and 8B are diagrams illustrating an incoming call screen that displays category-based additional information according to an embodiment of the present invention. FIG. 8A illustrates all categories related to a caller phone number and brief data of the respective categories. Although FIG. 8A merely illustrates a total number of each of call logs, text messages, pictures, this example and does not limit the present invention. For example, date and time of a recent call may be displayed for a call log category, key message details or key words may be displayed for a text message category, and a picture may be displayed for a picture category. In another example, when all categories are displayed, a view all option 800 may be provided for each category. If the user selects view all option 800 for the call log category, a details screen corresponding to the call log category is displayed, such as illustrated in FIG. 8B. A configuration of the details screen corresponding to the call log category may vary.

FIG. 9 is a diagram illustrating an incoming call screen that displays category-based additional information according to an embodiment of the present invention. FIG. 9 illustrates all categories related to a caller phone number on one screen, and in particular, details corresponding to each category are displayed using a sliding scheme. For example, for the call log category, details of the call logs including at least one of recent call details, a total number of calls, the number of calls within recent one month, an average talk time, and the longest talk time are displayed in a sliding manner in a slide box 900.

For the text message category, details of all text messages related to the caller phone number are displayed in a slide manner in a slide box 905 and only key message details or key words are able to slide in the slide box 905. For the picture category, a person's face image 910 may be displayed based on the order of priorities. In this case, a picture is assumed to be a still image and for a moving image, a preview image may be displayed. For the memo category, details or key words of a memo may be displayed in a slide manner in the slide box 915.

Although, in the above-described examples, a plurality of categories exist for additional information found in relation to a caller phone number, the number of categories to be displayed together for the caller phone number may be changed by the user. For example, upon a determination that the user is able to identify a caller merely with text message details, a setting may be performed in advance, through a display setting item for additional information related to a caller phone number to display only text message details for the caller phone number. In this case, additional information related to a caller phone number is only searched for in the text message category.

Figure 10A:
FIGS. 10A and 10B are diagrams illustrating an incoming call screen that displays category-based additional information according to an embodiment of the present invention.
Figure 10B:

FIGS. 10A and 10B are diagrams illustrating an incoming call screen that displays category-based additional information according to an embodiment of the present invention. When search for additional information related to a caller phone number is set to be performed only in a text message category or only a text message item exists as a category item previously stored for the caller phone number, an incoming call screen is output, such as illustrated in FIGS. 10A and 10B. The incoming call screen that displays category-based additional information configured as illustrated in FIGS. 7A through 7D may be implemented as illustrated in FIGS. 10A and 10B.

In FIG. 10A, when a plurality of text messages are searched for as additional information related to a caller phone number, a first text message 1000 is output. When a user input requesting display of the next text message by touching a left/right direction button or moving a text message is received, a next text message 1105 is output together with a caller phone number as illustrated in FIG. 10B. Also, without a separate user input, to show the next text message to the user, the text message may be moved from FIG. 10A to FIG. 10B in a slide manner.

While FIGS. 7A through 10B illustrate additional information output in various manners, embodiments of the present invention are not limited to these examples of additional information output. According to selections of users, service providers, or terminal manufacturers, various screen configurations are also possible. In addition, a configuration of an additional information providing screen according to embodiments of the present invention may be formed by the user or may be provided as a sort of contents from a contents provider and changed according to user's selection.

Although in the above-described examples, when a call is received, additional information indicating a caller of the call is output together with a caller phone number on an incoming call screen, embodiments of the present invention are also applicable to a missed call function. For example, in some instances, when the user desires to view a phone number of a missed call, if the phone number has been registered in the phone directory, only a name of a caller is displayed. Otherwise, if the phone number has not been registered in the phone directory, only the phone number is displayed without the name of the caller, such that it may be difficult for the user to accurately identify the caller. Thus, if additional information is output for the missed call, such as according to embodiments of the present invention, the user is able to more easily identify the caller of the missed call.

Figure 11:
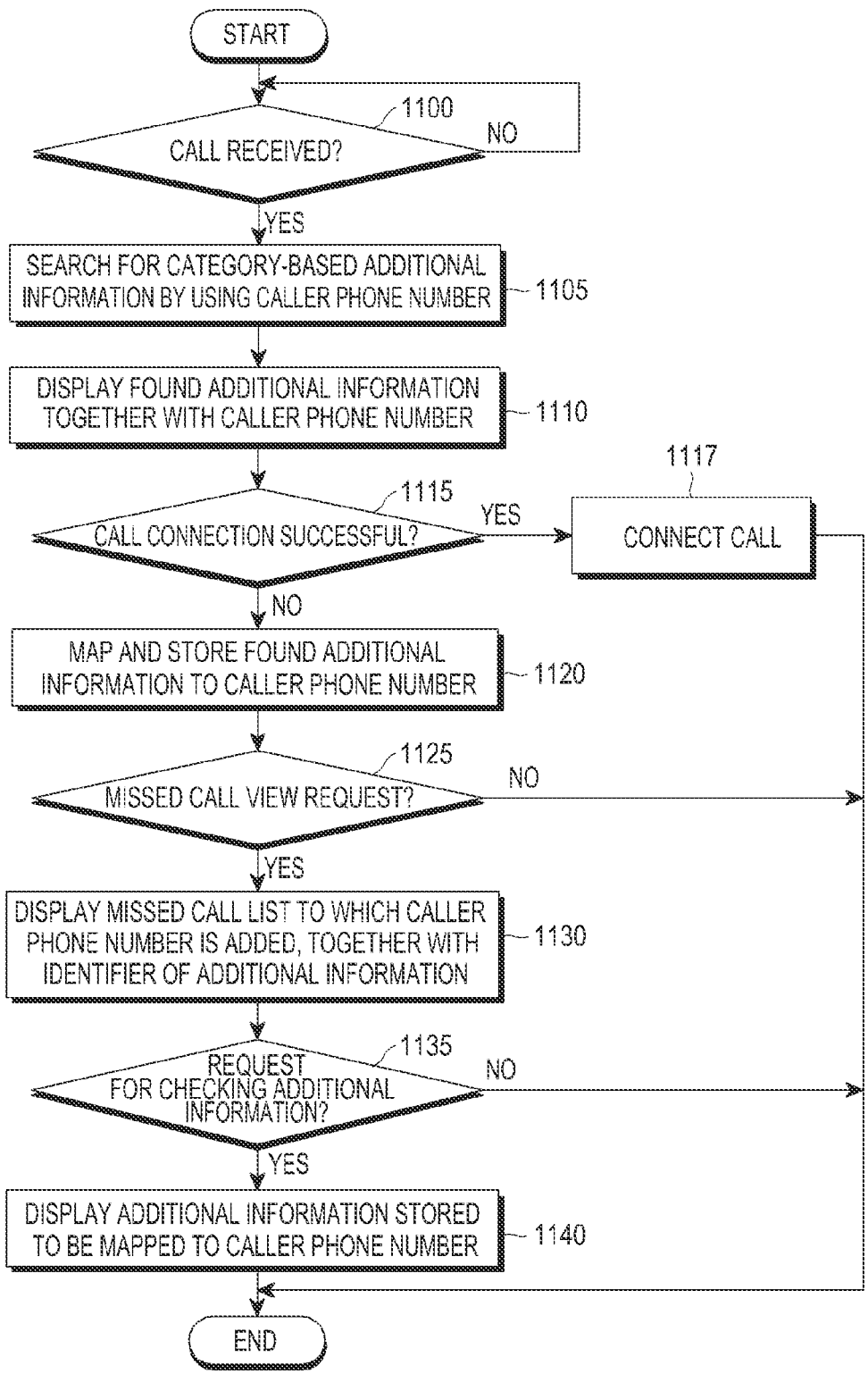
FIG. 11 is a flowchart illustrating a method for providing additional information by using a caller phone number when a missed call is received according to another embodiment of the present invention.

FIG. 11 is a flowchart illustrating a method for providing additional information by using a caller phone number when a missed call is received according to another embodiment of the present invention. In the following description, embodiments of the present invention are described using examples of FIGS. 12A through 12D, but methods for providing additional information related to a caller phone number according to embodiments of the present invention is not limited to those examples.

Referring to FIG. 11, steps 1100 through 1110 are the same as steps 500 and 510 of FIG. 5A, and thus are not described in further detail herein. In step 1115, the controller 110 determines whether a call connection is successful. If the call connection is successful (i.e., the user accepts call connection), call connection is performed in step 1117. However, if the user declines call connection or input for accepting call connection is not received, the controller 110 determines that call connection fails and proceeds to step 1120. In step 1120, the controller 110 maps and stores additional information found corresponding to the caller phone number. In step 1125, the controller 110 determines whether a missed call view request is input from the user. If the missed call view request is input, a missed call list to which the caller phone number is added is displayed together with an identifier of the additional information in step 1130.

Figure 12A:
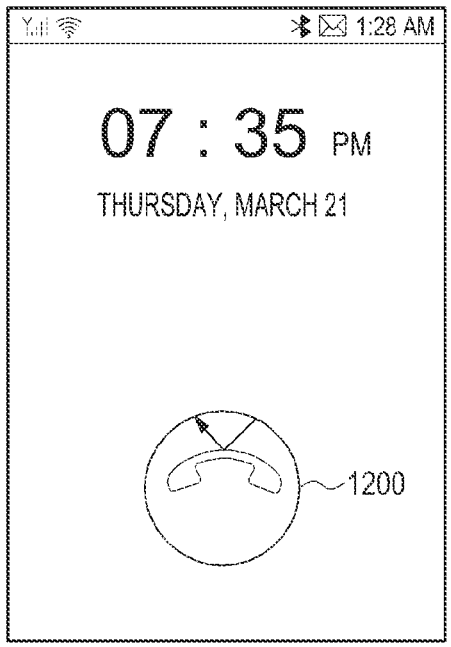
FIGS. 12A through 12D are diagrams illustrating a screen that displays additional information using a caller phone number when a missed call is received according to still another embodiment of the present invention.
Figure 12B:
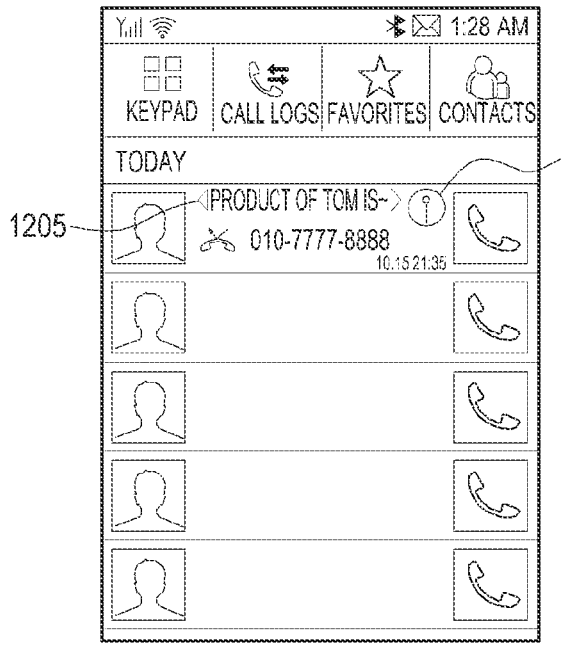

FIG. 12A illustrates a visual object 1200 indicating a missed call on a lock screen of the portable device 100. During display of the lock screen, upon input of a missed call view request (i.e., user input with respect to the visual object 1200), a missed call list screen is displayed, as illustrated in FIG. 12B. As illustrated in FIG. 12B, on the missed call list screen, a missed call list is displayed, which includes missed call items, such as time in which a missed call is received, a phone number of the missed call, and additional information 1205. The additional information 1205 may be displayed as key words of at least one category among details of respective categories, or as the details of the respective categories in a sliding manner. An identifier 1210 for retrieving detailed additional information for the phone number of the missed call may be further provided. Herein, the identifier 1201 is a visual object such as an icon, a text, an image, etc.

Figure 12C:
Figure 12D:

Thus, the controller 110 determines whether a request for checking the additional information through the identifier 1210 is input in step 1135. If the request is not input, the controller 110 terminates the missed call view function after a predetermined time. However, if the request for checking the additional information is input, the controller 110 displays additional information stored to be mapped to the phone number of the missed call, in step 1140. Accordingly, when the user desires to view details of the additional information, if a user input for selecting the identifier 1210 is input, additional information of all categories may be displayed on one screen as illustrated in FIG. 12C or the additional information may be displayed for each category as illustrated in FIG. 12D, thus displaying the detailed additional information for the phone number of the missed call.

Figure 13:
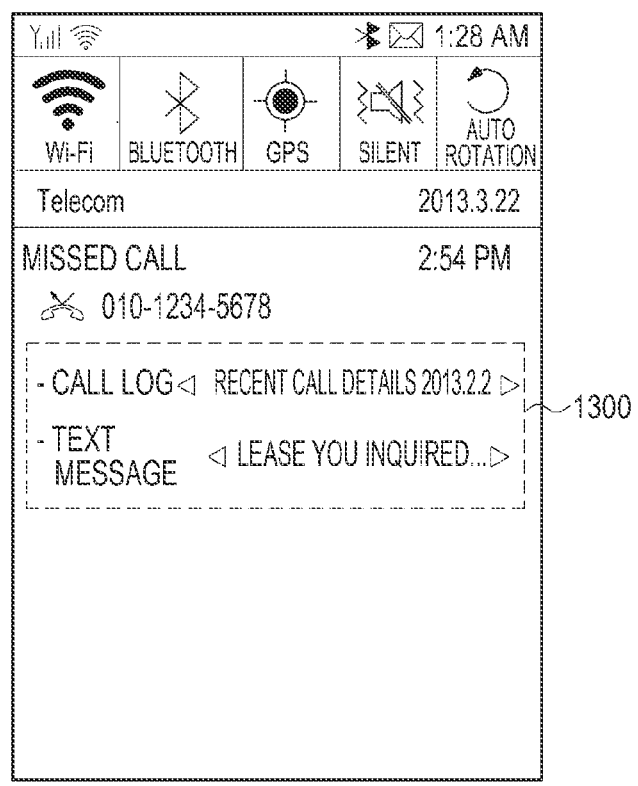
FIG. 13 is a diagram illustrating a screen that displays additional information using a caller phone number when a missed call is received according to further another embodiment of the present invention.

The additional information for the missed call may be displayed on the missed call list as illustrated in FIGS. 12A through 12D, but additional information may also be displayed on a notification region for a missed call, such as illustrated in FIG. 13.

In FIG. 13, additional information regarding a missed call is displayed on a notification region. To display the additional information, various display schemes may be used such that only key details may be displayed for each category, all additional information belonging to all categories is displayed on one screen, or the additional information may be displayed in a slide manner. In this way, additional information 1300 related to the phone number of the missed call is displayed on the notification region, allowing the user to easily identify a caller who made the missed call, without moving to a missed call list through several stages.

As is apparent from the foregoing description, according to embodiments of the present invention, even if the user does not register a caller phone number in a phone directory of the user's portable device, additional information related to the caller phone number is output by using stored additional information related to the caller phone number in the portable device, helping the user to identify the caller and allowing the user to determine whether to connect the call.

The portable device displays additional information related to a caller by using additional information in various multimedia data forms such as call logs, text messages, and images related to the caller phone number, allowing the user to easily identify the caller.

Moreover, according to embodiments of the present invention, the user is able to easily identify an unwanted caller without registering the caller in the phone directory, and such a caller may be prevented from being automatically registered in a phone-directory-based SNS service application. Consequently, the user is able avoid troublesome situations in which a picture or personal information is exposed to the unwanted caller.

Furthermore, for a caller whose phone number is registered in the phone directory, but who has the same name as another caller, or whom the user cannot remember, by displaying additional information in various forms as well as a name of the caller, the user is able to more accurately identify the caller.

The embodiments of the present invention may be implemented with hardware, software, or a combination of hardware and software. The software may be stored in a volatile or non-volatile storage such as a Read-Only Memory (ROM), a memory such as a Random Access Memory (RAM), a memory chip, a device, or an integrated circuit, and an optically or magnetically recordable and machine (e.g., computer)-readable storage medium such as a Compact Disc (CD), a Digital Versatile Disk (DVD), a magnetic disk, or a magnetic tape. A memory that can be included in the audio content playback apparatus includes, for example, a machine-readable storage medium that is suitable for storing a program or programs including instructions for implementing the audio content playback method according to the embodiment of the present invention. Therefore, embodiments of the present invention include a program including codes for implementing the audio content playback apparatus or method according to the embodiments of the present invention and a machine-readable storage medium for storing such a program. The program may be electronically transferred through a medium such as a communication signal delivered through wired or wireless connection, and the present invention properly includes equivalents thereof.

The portable device may receive and store the program from a program providing device through a wired or wireless connection. The program providing device may include a memory for storing a program including instructions for instructing the portable device to execute the claimed method for providing the additional information, information necessary for the method for providing the additional information, a communication unit for performing wired or wireless communication with the portable device, and a controller for transmitting a corresponding program to the portable device at the request of the portable device or automatically.

While the present invention has been particularly illustrated and described with reference to certain embodiments thereof, various modifications or changes can be made without departing from the scope of the present invention. Therefore, the scope of the present invention is not limited to the described embodiments, should be defined by the scope of the following claims and any equivalents thereof.

What is claimed is:

1. A method for providing additional information in response to reception of an incoming call in a portable device, the method comprising:
   when the incoming call is received, displaying an identification of the incoming call; and
   before call connection is performed:
      when a request is input for displaying the additional information, searching for a communication-related log, wherein the communication-related log is a log related to communication performed prior to reception of the incoming call, the communication-related log being stored in the portable device, wherein the stored communication-related log includes at least one category of additional information; and
      displaying together with the identification, a summary of each of the at least one category of additional information from the found communication-related log on a screen of the portable device, wherein each of the at least one category of additional information included in the found communication-related log is displayed on a separate page.

2. The method of claim 1, wherein the identification includes at least one of a phone number, a caller IDentification (ID) and an e-mail.

3. The method of claim 1, wherein the additional information includes at least one of call detail information for the identification, transmitted or received text information for the identification, text information generated in relation to the identification, and image file information related to the identification.

4. The method of claim 3, wherein at least some details of at least one of the call detail information, the text message information, and the text information are displayed in a sliding manner on an incoming call screen.

5. The method of claim 1, wherein displaying the communication-related log on the screen of the portable device before the call connection is performed comprises:
   displaying one of the pages on an incoming call screen; and
   displaying another page on the incoming call screen according to a user input or according to an automatic setting.

6. The method of claim 5, wherein the pages into which the text message information and the text information are classified include all words or found particular words of details of the text message information and the text information.

7. The method of claim 1, wherein searching for the communication-related log stored in the portable device comprises searching for a communication-related log matched to the identification in a database that stores a communication-related log for each identification.

8. The method of claim 1, further comprising:
   storing, if call connection with the identification is not performed in response to reception of the incoming call, the communication-related log for the identification.

9. The method of claim 8, further comprising:
   displaying the stored communication-related log together with the identification, if a missed call view request is input.

10. A portable device for providing additional information, the portable device comprising:
    a mobile communication module for receiving an incoming call;
    a storage unit for storing a log related to communication;
    a display;
    a controller for:
       controlling the display to display an identification of a caller from the received incoming call and a visual object for inputting a request for displaying the additional information, and
       before call connection is performed:
          when the request is input for displaying the additional information, searching for a communication-related log matched to the identification from the storage unit, wherein the stored communication-related log includes at least one category of additional information; and
          controlling the display to display, together with the identification, a summary of each of the at least one category of additional information from the found communication-related log on an incoming call screen, in response to the request wherein each of the at least One category of additional information included in the found communication-related log is displayed on a separate page.

11. The portable device of claim 10, wherein the identification includes at least one of a phone number, a caller IDentification (ID) and an e-mail.

12. The portable device of claim 10, wherein the additional information includes at least one of call detail information for the identification, transmitted or received text information for the identification, text information generated in relation to the identification, and image file information related to the identification.

13. The portable device of claim 12, wherein at least some details of at least one of the call detail information, the text message information, and the text information are displayed in a sliding manner on an incoming call screen.

14. The portable device of claim 10, wherein the controller controls the display to display one of the pages on an incoming call screen and displays another page on the incoming call screen according to a user input or according to an automatic setting.

15. The portable device of claim 14, wherein the pages into which the text message information and the text information are classified include all words or found particular words of details of the text message information and the text information.

16. The portable device of claim 10, wherein the controller searches for a communication-related log matched to the identification in a database that stores a log related to communication performed prior to reception of an incoming call for each of a plurality of identification.

17. The portable device of claim 10, wherein the controller controls the storage unit to store, if call connection with the caller phone number is not performed in response to reception of the incoming call, the communication-related log for the identification.

18. The portable device of claim 17, wherein the controller controls the display to display the stored communication-related log together with the identification, if a missed call view request is input.

\* \* \* \* \*